US008699571B2

(12) United States Patent  (10) Patent No.: US 8,699,571 B2
Bekiares et al.  (45) Date of Patent: Apr. 15, 2014

(54) METHOD AND APPARATUS FOR NON-LINEAR DECODING OF VIDEO FRAMES OF A VIDEO STREAM ENCODED USING AN INTRA MACROBLOCK REFRESH PROCESS

(75) Inventors: Tyrone D. Bekiares, Chicago, IL (US); Steven D. Tine, Buffalo Grove, IL (US)

(73) Assignee: Motorola Solutions, Inc., Schaumburg, IL (US)

(*) Notice: Subject to any disclaimer, the term of this patent is extended or adjusted under 35 U.S.C. 154(b) by 801 days.

(21) Appl. No.: 12/908,938

(22) Filed: Oct. 21, 2010

(65) Prior Publication Data

US 2012/0099645 A1  Apr. 26, 2012

(51) Int. Cl.
*H04N 7/12*  (2006.01)
(52) U.S. Cl.
USPC .................................. 375/240.12; 375/240.25
(58) Field of Classification Search
USPC ................... 375/240, 240.01, 240.12, 240.25
See application file for complete search history.

(56) References Cited

U.S. PATENT DOCUMENTS

| 5,726,711 | A | 3/1998 | Boyce |
| 6,069,919 | A | 5/2000 | Kwon et al. |
| 7,190,883 | B2 | 3/2007 | Yeo |
| 2004/0056884 | A1 | 3/2004 | Eifrig et al. |
| 2007/0088971 | A1 | 4/2007 | Walker et al. |

FOREIGN PATENT DOCUMENTS

| WO | 96/13121 A1 | 5/1996 |
| WO | 2011081786 A1 | 7/2011 |

OTHER PUBLICATIONS

PCT International Search Report Dated Apr. 13, 2011 for Counterpart Application PCT/US2011/053351.
ETRI, Samsung: "Zapping Delay and Video Codec", International Telecommunication Union, 1st IPTV Meeting, Jul. 14, 2006; XP002672513, Retrieved From the Internet: URL www.itu.int/ITU-T/IPTV/events/072006/docs/ID/FGIPTV-ID-0080e.doc.
Guy Cote Michael Gallant, et al. "Effects of Standard—Compliant Macroblock Intra Refresh on Rate-Distortion Performance", 5, VCEG Meeting; Jul. 21, 1998; Whistler, British Columbia, CA; (Video Coding Experts Group of ITU-T SG.16), No. q15e37, Jul. 29, 1998; XP030002845, ISSN: 0000-0471.

*Primary Examiner* — Allen Wong
(74) *Attorney, Agent, or Firm* — Valerie M. Davis; Kenneth A. Haas

(57) ABSTRACT

A video decoder system receives a user request for non-linear decoding of at least one video frame from a video stream encoded using an Intra macroblock refresh process. The request includes a first frame offset corresponding to a user requested first decoding frame within the video stream for commencing the non-linear decoding. The decoder system: determines an Intra-refresh period corresponding to at least one encoded Predictive frame in the video stream during which all macroblocks in the user requested first decoding frame are Intra encoded at least once; determines a second frame offset as a function of the Intra-refresh period and the user requested first frame offset, the second frame offset corresponding to a second decoding frame within the video stream. Finally, the decoder system decodes the video stream starting at the second decoding frame and suppresses the display of the video stream until the first decoding frame.

17 Claims, 2 Drawing Sheets

METHOD AND APPARATUS FOR NON-LINEAR DECODING OF VIDEO FRAMES OF A VIDEO STREAM ENCODED USING AN INTRA MACROBLOCK REFRESH PROCESS

TECHNICAL FIELD

The technical field relates generally to video decoding and more particularly to non-linear decoding of at least one video frame from a video stream encoded using an Intra macroblock refresh process.

BACKGROUND

The use of video continues to grow across consumer, enterprise, and public safety markets. Increasingly, video is used in a one-to-one video-on-demand model, where each viewer can watch the same or a different video stream at differing points in time. Moreover, in this context, viewers desire non-linear decoding of an encoded video stream, wherein non-linear decoding means starting the decoding process at an arbitrary frame within a video sequence. Non-linear decoding enables functions such as, but not limited to, rewind (RW), forward-(FW), pause (PAUSE), etc.; this class of functions is generally known in the industry as "trick play" functionality.

The method in which source video is encoded affects implementation of non-linear decoding. Modern video codecs employ two basic techniques for encoding source video, spatial image compression and temporal motion compensation. In either case, the source video is first divided into a sequence of frames each having a mesh of macroblocks. When all of the macroblocks within a frame are encoded using spatial image compression techniques, the frame is called an Intra or "I" frame, wherein the decoding of the frame does not depend upon the successful decoding of one or more previous frames. When some or all of the macroblocks within a frame are encoded using temporal motion compensation techniques, the frame is called a Predictive, Inter, or "P" frame, wherein the decoding of the frame depends upon the successful decode of one or more previous frames.

Modern video codecs achieve their incredible compression ratios largely through predictive encoding. However, to limit error propagation and to support non-linear, random access, Intra frames are injected into the video stream at regular intervals (e.g. every 1 or 2 seconds). This sequence of one Intra frame followed by a succession of Predictive frames is called a Group of Pictures, or GOP. Because of the predictive nature of video encoding, decoding traditionally must start at an Intra frame, or GOP boundary. As such, trick play functionality (e.g. rewind 5 seconds) must quantize the requested playback time to the nearest Intra frame, or start of a GOP. To increase the granularity at which trick play commands can function (e.g. rewind 1 second), one must generally decrease the GOP length, thus injecting more Intra frames more often.

Although helpful to trick play functionality, increasing the Intra frame insertion rate can be problematic in other ways. From an error resilience perspective, a poorly timed wireless fade (e.g. consecutive packet loss) could wipe out an entire Intra frame, causing existing prediction errors (resulting from previous packet loss) to continue to propagate forward in time. From a rate control perspective, Intra frames are "costly" with respect to Predictive frames; because all of the macroblocks in an Intra frame are encoded exclusively using spatial image compression techniques, the size of an Intra frame tends to be significantly larger than neighboring Predictive frames. This can produce an instantaneous spike in the average bit rate output of the encoder, or force the encoder to significantly degrade spatial or temporal quality of the subsequent Predictive frames to compensate in attempt to maintain an average output bit rate. Finally, given that modern video codecs achieve their significant compression ratios by exploiting spatial redundancy across time, an increased rate of Intra frames (which do not exploit such redundancies) will decrease overall compression efficiency.

Alternatively, an Intra macroblock refresh process can be employed to encode source video. An Intra macroblock refresh process is defined as an encoding process that avoids periodic insertion of Intra frames, and, rather, forces a set of macroblocks to be encoded using spatial image compression techniques across a set of Predictive frames such that within what is termed herein as an "Intra-refresh period" all of the marcoblocks within any given frame are Intra encoded at least once. In other words, some number of the macroblocks that comprise a given Predictive frame are forcibly Intra (e.g. no dependencies) encoded, regardless of whether or not their spatial content has changed radically from the previous frame. However, the problem with an Intra macroblock refresh process is that there are generally no frames in the stream in which all of the macroblocks are simultaneously refreshed. This is problematic for trick play and other forms of non-linear access, as there are no frames at which decoding can immediately commence.

Thus, there exists a need for a method and apparatus for performing trick play functionality (or non-linear decoding) of at least one video frame from a video stream encoded using an Intra macroblock refresh process.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
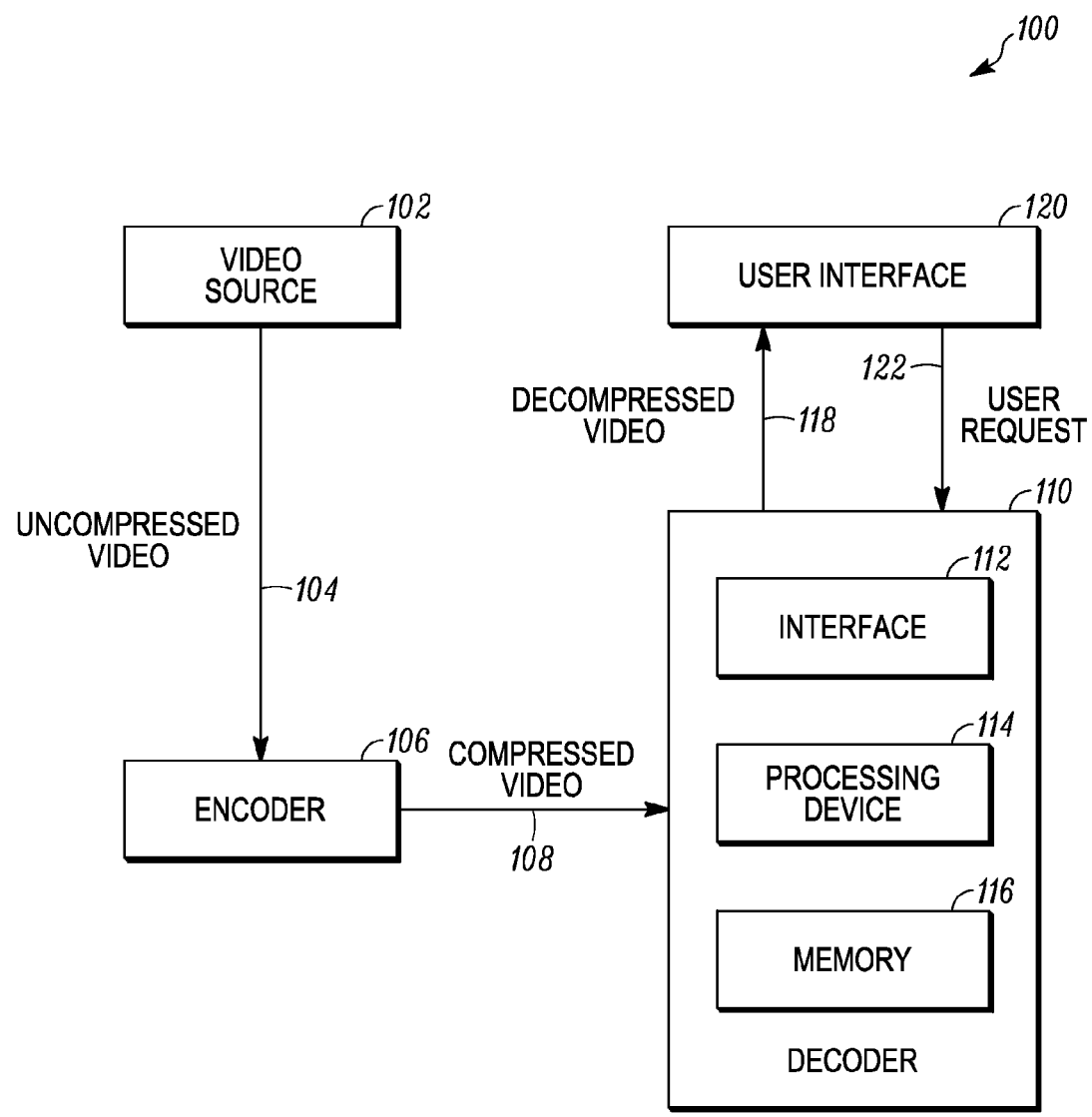
FIG. 1 is a block diagram of a video processing system that performs non-linear decoding of at least one video frame from a video stream encoded using an Intra macroblock refresh process, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a video decoder system receives a user request for non-linear decoding of at least one video frame from a video stream encoded using an Intra macroblock refresh process, wherein the request includes a user requested first frame offset corresponding to a user requested first decoding frame within the video stream for commencing the non-linear decoding. The video decoder system: determines an Intra-refresh period corresponding to at least one encoded Predictive frame in the video stream during which all macroblocks in the user requested first decoding frame are Intra encoded at least once; determines a second frame offset as a function of the Intra-refresh period and the user requested first frame offset, the second frame offset corresponding to a second decoding frame within the video stream, wherein the second decoding frame occurs earlier in time within the video stream than the user requested first decoding frame. Finally, the video decoder system decodes the video stream starting at the second decoding frame but suppresses display of the video stream until the user requested first decoding frame.

By employing this mechanism, trick play may start at any arbitrary time offset, and need not be quantized to specific Intra frame offsets. This allows random access to any frame while not requiring a prohibitively aggressive rate of Intra frame insertion or any Intra frame insertion for that matter. Similarly, by spreading Intra information across the Predictive frames, error resilience is improved, and the rate control is smoothed. Those skilled in the art will realize that the above recognized advantages and other advantages described herein are merely illustrative and are not meant to be a complete rendering of all of the advantages of the various embodiments.

Referring now to the drawings, and in particular FIG. 1, a video processing system that performs non-linear decoding of one or more video frames from a video stream encoded using an Intra macroblock refresh process in accordance with some embodiments is shown and indicated generally at 100. Video processing system 100 includes a video source 102, an encoder 106, a decoder 110, and a user interface 120. A "decoder system", as the term is used herein, includes at least the decoder 110 and may also include the encoder 106, such as within a digital video recorder. In another embodiment, a video server (not shown) is coupled between the encoder 106 and the decoder 110, and the video server receives and stores compressed video 108 (from the encoder 106) until it is requested by the decoder 110.

The video source 102 can be any source (e.g., a camera, file, etc.) that provides "uncompressed video" 104, meaning the state of the video as it enters the encoder, which applies spatial and temporal compression; such video in an uncompressed state is described using a bitmap of pixels, and not quantized transforms and motion vectors. "Video", "video sequence", or "video stream", as the terms are used herein interchangeably, mean one or more images comprising a plurality of pixels; wherein when there are a plurality of images, the video is, thereby, a sequence of still images with each image in the video sequence being termed a "frame". Thus, the video source 102 can alternatively comprise, but is not limited to, a still image camera, a storage medium holding one or more still images, a storage medium holding a sequence of frames, etc.

The encoder 106 can be integrated within the video source 102 or can be a stand alone device that is coupled to the video source 102 using any suitable wired or wireless means. The encoder 106 uses any suitable algorithm for performing macroblock-based spatial and temporal compression of the pixels in the uncompressed video 104 to generate compressed video 108. Examples of such encoding algorithms include, but are not limited to, standard video compression technologies like MPEG-2, MPEG-4, H.263, VC-1, VP8, H.264, etc.

Operationally, the encoder 106 encodes a video stream (i.e., the uncompressed video 104) using an Intra macroblock refresh process. The encoder 106 divides each Predictive frame into a plurality of macroblocks of pixels, which are Intra, or encoded using spatial image compression techniques or Predictive, or Inter, or encoded using temporal motion compensation techniques. Intra macroblocks are characterized by a set of quantized coefficients used to describe the contained spatial data after it is transformed into the frequency domain. Predictively encoded macroblocks are characterized by a set of motion vectors used to describe the movement of the contained pixels across frames, and may also be characterized by a set of quantized coefficients used to spatially describe contained pixels which are not accurately described after the motion compensation process.

The decoder 110, in an embodiment, is included within a mobile communication device such as a cellular phone, a personal digital assistant (PDA), a laptop computer, a digital set top box, a digital video recorder, and the like and may further be integrated with the encoder 106. The decoder 110 (and the encoder and video server, although the corresponding elements are not shown in FIG. 1) comprises an interface 112, a processing device 114, and a memory 116 that are operatively coupled, and which when programmed form the means for these system elements to implement their desired functionality, for example as illustrated by reference to the flow diagram shown in FIG. 2. The interface 112 is used for receiving and providing video (e.g., compressed video 108, decompressed video 118) and receiving user requests 122 for video.

The implementation of the interface 112 of the decoder 110 depends on the particular manner in which the encoder 106 and decoder 110 (and the user interface 120 and the decoder 110 or the decoder 110 and a video server when the system includes this element) are coupled, i.e., wired and/or wirelessly, and/or the manner by which the decoder receives the compressed video 108 and delivers the decompressed video 118. For example, where these elements are coupled via a direct wired connection or the compressed video is downloaded from a memory stick, the interface 112 may comprise a serial port interface (e.g., compliant to the RS-232 standard), a parallel port interface, an Ethernet interface, a USB interface, and/or a FireWire interface, and the like. In other embodiments, the interface may support downloading the compressed video 108 from other types of computer-readable storage media such as CD-ROMs.

Where these elements are coupled via a network that supports wireless communications, the interface 112 comprise elements including processing, modulating, and transceiver elements that are operable in accordance with any one or more standard or proprietary wireless interfaces, such as EVDO, WCDMA, LTE, WiMax, WiFi, and the like, wherein some of the functionality of the processing, modulating, and transceiver elements may be performed by means of the processor 114 of the decoder through programmed logic such as software applications or firmware stored on the memory 116 of the decoder.

The processing device 114 utilized in the decoder 110 may be programmed with software or firmware logic or code for performing functionality described by reference to FIG. 2; and/or the processing device may be implemented in hardware, for example, as a state machine or ASIC (application specific integrated circuit). The memory 116 can include short-term and/or long-term storage of various information needed for the functioning of the respective elements. The memory 116 may further store software or firmware for programming the processing device 114 with the logic or code needed to perform its functionality. Moreover, although the elements 112, 114, 116 are shown as being included on a single separate hardware platform, these elements can easily comprise a shared hardware platform with at least one mobile communication device and/or a mobile storage device.

Figure 2:
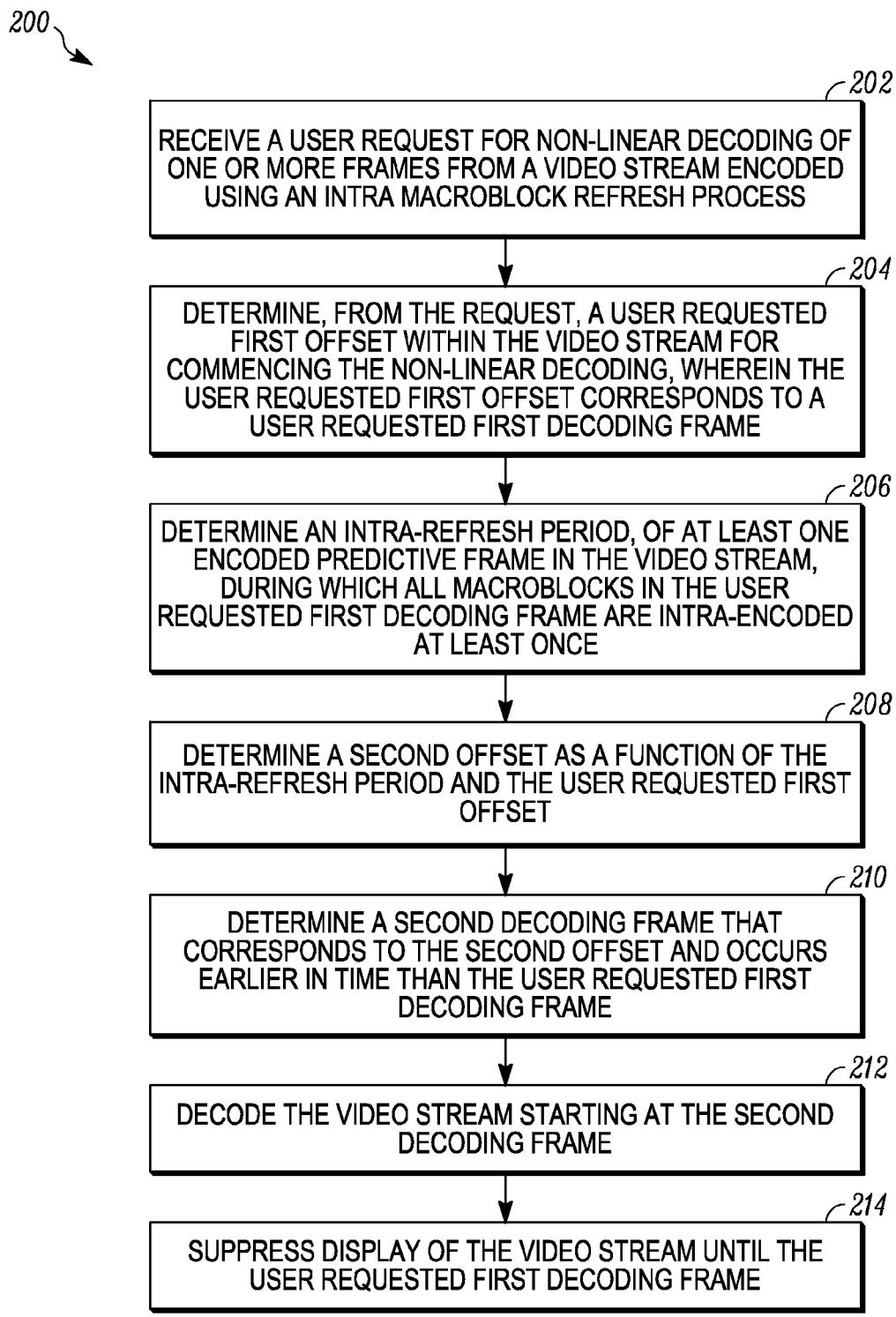
FIG. 2 is a flow diagram of a method for non-linear decoding of at least one video frame from a video stream encoded using an Intra macroblock refresh process, in accordance with some embodiments.

Turning now to FIG. 2, a method 200 is shown for performing non-linear decoding of one or more video frames from a video stream encoded using an Intra macroblock refresh process, in accordance with some embodiments. Method 200 is performed, for instance, in the decoder 110. The decoder receives (202) via the interface 112 a user request 122 for non-linear decoding of one or more frames from a video stream (e.g., compressed video 108) that was encoded using an Intra macroblock refresh process. For example, the user is viewing a particular video and wants to go back to some previously viewed video or skip ahead to some yet unviewed video and, accordingly, presses the rewind or fast-forward button on her remote control.

The decoder determines (204), from the request, a user requested first frame offset for commencing the non-linear decoding and, thereby or also, a frame within the video sequence that corresponds to and, for example, is time aligned with the user requested frame offset. This frame is referred to as the user requested first decoding frame, which is the arbitrary frame at which the user has requested to start viewing the video sequence. As the term is used herein a "frame offset" means a location within a video sequence for commencing a decoding process on a given frame within the video sequence, wherein that given frame corresponds to the frame offset. The frame offset can be indicated in any suitable way including, but not limited to, a frame number, time offset or some time indication, a sequence number, etc. Accordingly, the user may directly request a decoding frame (e.g., by frame number) or a time offset to commence the trick play functionality and that decoding frame or time offset is indicated by the frame offset in the request.

At 206, the decoder determines an Intra-refresh period, corresponding to at least one Predictive frame (or the time period corresponding to at least one Predictive frame) within the video sequence. The Intra-refresh period is the period during which all macroblocks in the user requested first decoding frame have been refreshed (i.e., Intra or encoded using spatial image compression techniques) at least once. The Intra-refresh period is used, as will be explained in detail below, in determining the frame at which to start the decoding process so that a proper decode can be performed of the user requested first decoding frame. It should be noted that in one implementation scenario, the Intra-refresh period is determined before the decoder receives the user request and is stored (e.g., in memory 116) for later retrieval as needed. In this sense, the decoder 106 "determining" the Intra-refresh period comprises the decoder 106 obtaining or retrieving the Intra-refresh period from memory.

A number of embodiments can be implemented to determine the Intra-refresh period. In a first illustrative embodiment, the decoder, using processing device 114, determines the Intra-refresh period. In this illustrative embodiment, it is assumed that the Intra-refresh period is constant across the video sequence, and it is assumed, for the purposes of calculating the Intra-refresh period, that macroblocks are only Intra encoded as a function of the Intra macroblock refresh process. In actuality, certain macroblocks may be Intra encoded by the encoder as a function of the standard encoding process if they contain substantially new content which cannot be derived through prediction. That said, in this mode of operation, the decoder doesn't have knowledge or awareness of when certain macroblocks may be coincidentally Intra encoded as a function of the standard encoding process; it is only aware of the worst case Intra-refresh period, which is always applicable.

Accordingly, in this first embodiment with the constant Intra-refresh period, when the decoding is first started, the decoder determines the number of macroblocks that comprise each frame (this number is constant, and is a function of the encoded video resolution). The decoder then initializes a two-dimensional matrix of Delta Frame Counts (DFC), which is stored or recorded in the memory 116, where the size of the matrix is the number of macroblocks in each frame, and there is a one-to-one relationship between a Delta Frame Count value and a macroblock (i.e., for each macroblock within a frame, there is one DFC value), wherein the DFC value indicates or corresponds to the number of encoded frames which have elapsed or transpired since a particular macroblock was last Intra encoded. When the decoder first initializes the matrix, all DFCs are set to infinity (which represents an initial DFC value) since the decoder does not know the last time the corresponding macroblock was Intra encoded.

Thus, the decoder has initially started decoding video at some arbitrary frame offset in the encoded video stream, and all DFCs in the matrix are infinity. For this first frame, the decoder examines each macroblock in the encoded video frame (likely as part of the standard decoding process). If a given macroblock was Intra encoded, the corresponding DFC value is changed from the initial DFC value, and a current DFC value is determined or set to 0, for example, indicating that the macroblock was Intra encoded in this frame. However, if a given macroblock was Predictively encoded, the corresponding DFC value is left at infinity.

Then the decoder examines each macroblock in the next encoded video frame. If a given macroblock is Intra encoded, the corresponding DFC value changes from the initial DFC value to a current DFC value of 0. If instead the macroblock is Predictively encoded, and the last DFC value for this macroblock is still infinity, it is left at infinity. If the macroblock is Predictively encoded, and the last DFC value for this macroblock isn't infinity, the current DFC value is incremented by 1. In that way, a "current" DFC value represents the number of encoded frames which have transpired since a given macroblock was last Intra encoded.

The decoder continues in this fashion until none of the DFC counts are infinity or, in other words, until all of the DFC values have been changed from the initial DFC values. At this point, the Intra-refresh period can be determined by selecting the maximum DFC value, MAX(DFC), from the matrix. This value represents, for example, the number of frames the decoder must subtract from a requested video frame to ensure that all macroblocks have been Intra encoded at least once prior to the requested frame. The decoder need only update the DFC matrix once per sequence; it can assume the Intra-refresh period is constant, and this MAX(DFC) value represents a worst-case and always applicable number for the current video sequence.

As previously noted, encoders may Intra encode certain macroblocks as part of the standard encoding process, and not explicitly to support an Intra macroblock refresh process. Since a decoder is not necessarily aware of which Intra macroblocks were coincidentally Intra encoded as a function of the standard encoding process versus which were explicitly Intra encoded as a function of the Intra macroblock refresh process, it is possible that a macroblock coincidentally Intra encoded may cause an improper calculation of the Intra-refresh period. Thus, in this embodiment, where the decoder must implicitly determine the Intra-refresh period, a decoder can compute the Intra-refresh period over two or more segments or sections of the video sequence to generate a set of candidate Intra-refresh periods, wherein the Intra-refresh period with the highest frequency from the set of candidate Intra-refresh periods is selected as the Intra-refresh period for the video stream. When the same Intra-refresh period is calculated over two or more segments of the video sequence, the decoder can be relatively confident that the determined Intra-refresh period is a worst-case, always applicable, value.

In alternate embodiments, other ways can be implemented to track DFC values. For example, instead of directly keeping track of and recording the number of frames which have transpired since a given macroblock was Intra encoded, the decoder could instead record the frame time stamp or frame sequence number of the last time a given macroblock was Intra encoded, which can be determined from metadata embedded within the frames or transmitted packets during the encoding process, for instance. In another alternate embodiment, this computation is not performed in the decoder, but rather in a video server serving the decoder and then provided to the decoder at start-up. Thus, in this scenario, the decoder "determines" the Intra-refresh period by obtaining it from the server. In another alternate embodiment, the Intra-refresh period, definitively known by the encoder, can be sent as metadata to the decoder.

In another alternate embodiment, the computation is performed for every frame, prior to a user requesting non-linear access to the sequence, rather than always assuming the worst case. As noted, some macroblocks are Intra encoded by the encoder because they contain substantially new spatial data, rather than being forcibly Intra encoded as a function of the Intra macroblock refresh process. Thus, we can optimize the number of frames a decoder must subtract from a requested frame if the decoder tracks MAX(DFC) on a frame-by-frame basis (instead of calculating it once for the entire video sequence as described in the embodiments above). This obviously requires that either the decoder or the video server have access to the entire video sequence, and that it has decoded every frame of the stream once prior to non-linear access requests from the user. This would work well for recorded content, and a video processing engine can calculate the MAX(DFC) for every frame and write these per frame results to a metadata file which the decoder or video server can access along with the encoded video content. Alternatively, this per frame metadata could be embedded in the video stream itself.

Turning back method 200 of FIG. 2, at 208, the decoder determines a second offset as a function of the user requested first offset and the Intra-refresh period, MAX(DFC), and determines (210) the corresponding frame (referred to herein as a second decoding frame) that corresponds to and is, for instance, time aligned with this second offset. The second decoding frame occurs earlier in time, with respect to the containing video sequence, than the user requested decoding frame and represents how many frames prior to the user requested frame the decoder needs to decode in order to properly decode the user requested frame or set of frames. In an illustrative implementation, the second offset is determined by subtracting the MAX(DFC) from the user requested offset.

Accordingly, the decoder begins decoding (212) the video stream at the second decoding frame (at the second offset) and suppresses the display or playback (214) of the video stream at the user interface 120. Thus, the partially decompressed video 118 is suppressed from display on the user interface 120 starting with the second decoding frame until the user requested decoding frame (at the user requested offset) is reached, at which time the video is presented normally on the user interface 120. In this manner, trick play functionality can be performed at any arbitrary point in a video sequence that has no Intra frames inserted therein.

Consider now a specific example of non-linear decoding in accordance with the teachings herein for further understanding of the disclosed embodiments. Assume that MAX(DFC) of a given video sequence was calculated at 60 encoded frames (i.e. a 2 second time period, assuming 30 frames/second encoding). Therefore, if the user wants to start playback at a time offset of 5 minutes and 30 seconds (i.e. frame #200), the decoder would request actual playback at 5 minutes and 28 seconds (i.e. frame #140). Regardless of the requested trick play function (rewind, fast-forward, pause), the request can be simplified to the decoding of a set of encoded frames at an arbitrary point in time in a video sequence.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. For example, the method steps described herein and illustrated within the drawings do not necessarily require the order shown unless explicated stated herein. As such, the steps described may be taken out of sequence and come steps may be performed simultaneously and still fall within the scope of the teachings and the claims herein. In addition, the benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for non-linear decoding of one or more video frames of a video stream encoded using an Intra macroblock refresh process described herein. The non-processor circuits may include, but are not limited to, a radio receiver, a radio transmitter, signal drivers, clock circuits, power source circuits, and user input devices. As such, these functions may be interpreted as steps of a method to perform non-linear decoding of one or more video frames of a video stream encoded using an Intra macroblock refresh process described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a non-transitory computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for non-linear decoding of at least one video frame from a video stream encoded using an Intra macroblock refresh process, the method comprising:
   a video decoder system performing:
   receiving a user request for non-linear decoding of at least one video frame from a video stream encoded using an Intra macroblock refresh process, wherein the request includes a user requested first frame offset corresponding to a user requested first decoding frame within the video stream for commencing the non-linear decoding;
   determining an Intra-refresh period corresponding to at least one encoded Predictive frame in the video stream during which all macroblocks in the user requested first decoding frame are Intra encoded at least once;
   determining a second frame offset as a function of the Intra-refresh period and the user requested first frame offset, the second frame offset corresponding to a second decoding frame within the video stream, wherein the second decoding frame occurs earlier in time within the video stream than the user requested first decoding frame;
   decoding the video stream starting at the second decoding frame; and
   suppressing display of the video stream until the user requested first decoding frame.

2. The method of claim 1, wherein determining an Intra-refresh period comprises receiving the Intra-refresh period from a video server or an encoder.

3. The method of claim 1, wherein the Intra-refresh period is constant.

4. The method of claim 1, wherein an Intra-refresh period is determined for each frame in the video stream.

5. The method of claim 1, wherein determining the Intra-refresh period comprises:
   determining a first number of macroblocks included in each frame of the video stream,
   initializing a matrix of macroblocks, the matrix having a size equal to the first number of macroblocks with each macroblock in the matrix corresponding to a single initial delta frame count (DFC) value, wherein the DFC value corresponds to a number of frames that have elapsed since the macroblock was last Intra encoded;
   decoding frames in the stream and determining a current DFC value for one or more macroblocks in the matrix, wherein the decoding and determining the current DFC values continues until all of the DFC values in the matrix have been changed from the initial DFC value; and
   setting the Intra-refresh period to a maximum DFC value in the matrix.

6. The method of claim 5, wherein the DFC value records a frame count since the last time the corresponding macroblock was Intra encoded.

7. The method of claim 5, wherein the DFC value records a frame time stamp since the last time the corresponding macroblock was Intra encoded.

8. The method of claim 5, wherein the DFC value records a frame sequence number since the last time the corresponding macroblock was Intra encoded.

9. The method of claim 5, wherein determining the Intra-refresh period is repeated over multiple sections of the video stream to generate a set of determined Intra-refresh periods.

10. The method of claim 9, wherein the Intra-refresh period with the highest frequency from the set of determined Intra-refresh periods is selected as the Intra-refresh period for the video stream.

11. The method of claim 1, wherein the second frame offset is determined by subtracting the Intra-refresh period from the user requested first frame offset.

12. A video decoder system for non-linear decoding of video frames in a video stream, the video system comprising:
an interface that receives a user request for non-linear decoding of at least one video frame from a video stream encoded using an Intra macroblock refresh process, wherein the request includes a user requested first frame offset corresponding to a user requested first decoding frame within the video stream for commencing the non-linear decoding; and
a processing device that:
determines an Intra-refresh period corresponding to at least one encoded
Predictive frame in the video stream during which all macroblocks in the user requested first decoding frame are Intra encoded at least once;
determines a second frame offset as a function of the Intra-refresh period and the user requested first frame offset, the second frame offset corresponding to a second decoding frame within the video stream, wherein the second decoding frame occurs earlier in time within the video stream than the user requested first decoding frame;
decodes the video stream starting at the second decoding frame; and
suppresses display of the video stream until the user requested first decoding frame.

13. The video decoding system of claim 12, wherein the processing device determines the Intra-refresh period by:
determining a first number of macroblocks included in each frame of the video stream,
initializing a matrix of macroblocks, the matrix having a size equal to the first number of macroblocks with each macroblock in the matrix corresponding to a single initial delta frame count (DFC) value, wherein the DFC value corresponds to a number of frames that have elapsed since the macroblock was last Intra encoded;
decoding frames in the stream and determining a current DFC value for one or more macroblocks in the matrix, wherein the decoding and determining the current DFC values continues until all of the DFC values in the matrix have been changed from the initial DFC value; and
setting the Intra-refresh period to a maximum DFC value in the matrix.

14. The video decoding system of claim 12, wherein the processing device determines the second frame offset by subtracting the Intra-refresh period from the user requested first frame offset.

15. A non-transient computer-readable storage medium having computer-readable code stored thereon for programming a computer to perform a method for non-linear decoding of at least one video frame from a video stream encoded using an Intra macroblock refresh process, the method comprising:
receiving a user request for non-linear decoding of at least one video frame from a video stream encoded using an Intra macroblock refresh process, wherein the request includes a user requested first frame offset corresponding to a user requested first decoding frame within the video stream for commencing the non-linear decoding;
determining an Intra-refresh period corresponding to at least one encoded Predictive frame in the video stream during which all macroblocks in the user requested first decoding frame are Intra encoded at least once;
determining a second frame offset as a function of the Intra-refresh period and the user requested first frame offset, the second frame offset corresponding to a second decoding frame within the video stream, wherein the second decoding frame occurs earlier in time within the video stream than the user requested first decoding frame;
decoding the video stream starting at the second decoding frame; and
suppressing display of the video stream until the user requested first decoding frame.

16. The non-transient computer-readable storage medium of claim 15, wherein the method further comprising:
determining a first number of macroblocks included in each frame of the video stream,
initializing a matrix of macroblocks, the matrix having a size equal to the first number of macroblocks with each macroblock in the matrix corresponding to a single initial delta frame count (DFC) value, wherein the DFC value corresponds to a number of frames that have elapsed since the macroblock was last Intra encoded;
decoding frames in the stream and determining a current DFC value for one or more macroblocks in the matrix, wherein the decoding and determining the current DFC values continues until all of the DFC values in the matrix have been changed from the initial DFC value; and
setting the Intra-refresh period to a maximum DFC value in the matrix.

17. The non-transient computer-readable storage medium of claim 15, wherein the method further comprising determining the second frame offset by subtracting the Intra-refresh period from the user requested first frame offset.

* * * * *

UNITED STATES PATENT AND TRADEMARK OFFICE
CERTIFICATE OF CORRECTION

PATENT NO. : 8,699,571 B2
APPLICATION NO. : 12/908938
DATED : April 15, 2014
INVENTOR(S) : Tyrone D. Bekiares et al.

It is certified that error appears in the above-identified patent and that said Letters Patent is hereby corrected as shown below:

ON THE TITLE PAGE:

In Item (56), under "OTHER PUBLICATIONS," in Column 2, Line 8, delete "Rate-Distrotion" and insert -- Rate-Distortion --, therefor.

IN THE SPECIFICATION:

In Column 5, Line 65, delete "decoder 106" and insert -- decoder 110 --, therefor.

In Column 5, Line 66, delete "decoder 106" and insert -- decoder 110 --, therefor.

IN THE CLAIMS:

In Column 11, Lines 23-25, in Claim 12, delete "Predictive frame in the video stream during which all macroblocks in the user requested first decoding frame are Intra encoded at least once;" and insert the same at Line 22, -- "least one encoded predictive frame in the video stream during which all macroblocks in the user requested first decoding frame are Intra encoded at least once;" --, therefor.

Signed and Sealed this
Tenth Day of May, 2016

Michelle K. Lee
*Director of the United States Patent and Trademark Office*